(No Model.)
A. E. DART.
UNION COUPLING.
No. 424,468. Patented Apr. 1, 1890.
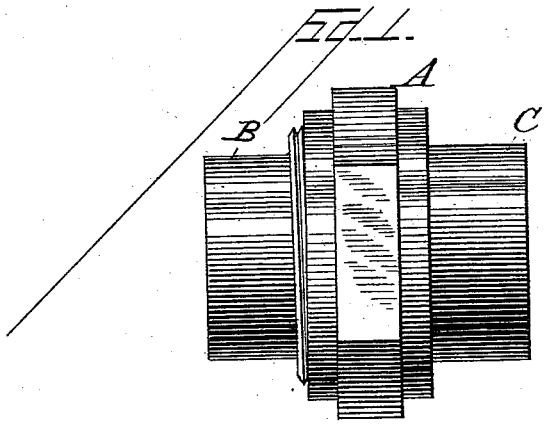
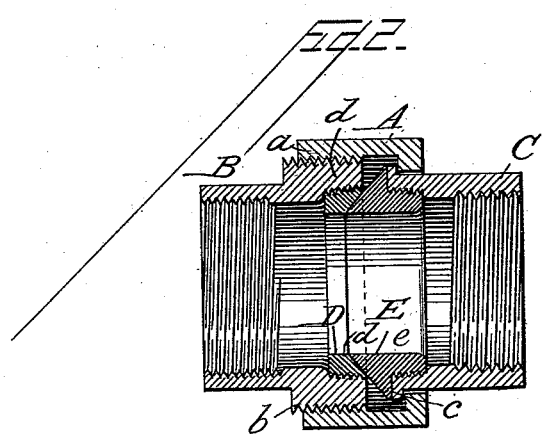
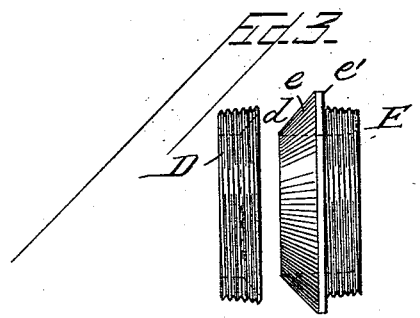
Attest:
F. H. Schott
Fred E. Tasker.
Inventor
Albert E. Dart
by John C. Tasker
atty.

UNITED STATES PATENT OFFICE.

ALBERT E. DART, OF PROVIDENCE, RHODE ISLAND, ASSIGNOR OF THREE-FOURTHS TO OZRO C. HEATH AND THOMAS C. HIDDEN, OF SAME PLACE, AND THOMAS M. WHEELER, OF GREENWICH, RHODE ISLAND.

UNION-COUPLING.

SPECIFICATION forming part of Letters Patent No. 424,468, dated April 1, 1890.

Application filed December 14, 1889. Serial No. 333,706. (No model.)

*To all whom it may concern:*

Be it known that I, ALBERT E. DART, a citizen of the United States, residing at Providence, in the county of Providence and State of Rhode Island, have invented certain new and useful Improvements in Union-Couplings; and I do hereby declare the following to be a full, clear, and exact description of the invention, such as will enable others skilled in the art to which it appertains to make and use the same.

This invention relates to an improvement in unions or couplings for pipes of various kinds, its object being to provide a simple, durable, and efficient union which may afford an exceedingly tight, close, firm, and neat joint in connecting pipes, tubes, or other passages adapted to convey water, gas, steam, air, or other liquid or fluid, said joint being superior to the forms of joint now in common use; and the invention consists, essentially, in the construction, arrangement, and combination of parts, substantially as will be hereinafter fully described and claimed.

In the annexed drawings illustrating my invention, Figure 1 is a side elevation of my improved union-joint. Fig. 2 is a vertical longitudinal section of the same. Fig. 3 is a detail side view of the male and female portions of the seat of the union.

Like letters of reference denote corresponding parts throughout the different figures of the drawings.

A designates the coupling-nut, B the end of one pipe or member of the union, said member being the female member, and C the end of the other pipe or member of the union, said member being the male member. These parts may of course vary in size and form in different instances, and with pipes of different kinds, and these given here are by way of example only, to illustrate the practical application of the invention. The nut is threaded in the ordinary way at $a$, and the female member is correspondingly threaded at $b$ to engage the threaded portion of the nut, while the male member has a flange $c$, adapted to rest against a flange or shoulder on the nut, as shown.

D designates the female member of the seat of the union. It consists of an annular ring or bushing having a tapered or beveled face $d$. Its outer surface is slightly tapered and screw-threaded. The end of the member B is internally threaded on a bevel or taper for a suitable distance and adapted to receive the external threaded bushing D. When the bushing is screwed into the end of the female member, its taper threaded side engages very tightly the taper threaded portion of the member, and thus the bushing is fixed securely and immovably in place, although it is evident that it may be readily removed when desired by the use of proper means.

E denotes an annular ring forming the male portion of the seat of the union. It is provided with the bevel-face $e$, the annular flange $e'$, and a tapering screw-threaded portion adapted to engage similar tapering screw-threads formed internally on the end of the male member C of the coupling. When the ring E has been connected to the member C, its tapering threaded portion tightly engaging the tapering threaded portion of said member, the flange $e'$ will rest neatly against the outer annular end of the member C. Thus the ring E will be firmly fixed in position, although it, likewise with the bushing D, may be readily removed from this position by the use of proper means.

When the two parts of the union are brought into contact with each other, it will be evident that the male portion E of the seat will come into close contact with the portion D of the seat, the bevel-face $e$ resting closely against the bevel-face $d$, forming a tight, close, and neat joint. The bushing D and ring E are composed of hard metal. They are preferably made of bronze, brass, or some similar material; but they may be made of any hard non-corrosive substance. The seat thus made will be found tight and impermeable, and, as the two members of the coupling are brought tightly into contact with each other, it will be found that the hard-metal seat will form a joint possessing many practical advantages.

Having thus described my invention, what I claim as new, and desire to secure by Letters Patent, is—

1. A union-coupling for pipes, consisting in the combination of the nut, the members, an independent hard-metal seat connected to one member and having a beveled face, and an independent hard-metal seat connected to the other member and likewise having a beveled face and a flange fitting over the end of the member.

2. A pipe-union consisting in the combination of a threaded nut, a female member, its hard-metal bushing having a beveled face, the male member and its connected ring of hard metal having a beveled face, adapted to come into close contact with the beveled face of the bushing, and having a flange fitting closely over the end of the member.

3. The combination of the nut, the two members, both of which are provided with an internal tapering screw-thread, the hard-metal bushing inserted in one member having an inclined outer face, the hard-metal ring inserted in the other member having an inclined face, and a flange fitting over the end of the member.

4. In a union-joint, the threaded ring or nut A, the member B, threaded to engage the nut and having an interior tapering thread near the end thereof, the hard-metal bushing D, having the corresponding tapering thread to engage the threaded member, and having an inclined face $d$, the other member C having likewise an interior tapering thread, the hard-metal ring E, having a tapering thread to fit the thread on the member C, and having bevel-face $e$ and flange $e'$, said parts D and E forming the seat of the union and adapted to afford a tight joint.

In testimony whereof I affix my signature in presence of two witnesses.

ALBERT E. DART.

Witnesses:
HENRY B. BOLTON,
FRED E. TASKER.